G. W. HAMILTON.
TROLLEY.
APPLICATION FILED JUNE 28, 1911.

1,100,731.

Patented June 23, 1914.
3 SHEETS—SHEET 2.

WITNESSES:
C. L. Belcher
B. B. Hines

INVENTOR
George W. Hamilton
BY
Wesley G. Carr
ATTORNEY

G. W. HAMILTON.
TROLLEY.
APPLICATION FILED JUNE 28, 1911.

1,100,731.

Patented June 23, 1914.
3 SHEETS—SHEET 3.

WITNESSES:
C. L. Belcher
B. B. Hines

INVENTOR
George W. Hamilton
BY
Wesley G. Carr
ATTORNEY

UNITED STATES PATENT OFFICE.

GEORGE W. HAMILTON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

TROLLEY.

1,100,731.    Specification of Letters Patent.    Patented June 23, 1914.

Application filed June 28, 1911. Serial No. 635,904.

*To all whom it may concern:*

Be it known that I, GEORGE WILLIAM HAMILTON, a subject of the King of Great Britain, and a resident of Edgewood Park, in the county of Allegheny and State of Pennsylvania, have invented a new and useful Improvement in Trolleys, of which the following is a specification.

My invention relates to trolleys for electrically propelled vehicles, and particularly to devices of this character which are intended and adapted for use in connection with mine locomotives.

The object of my invention is to provide a trolley of simple, compact and durable construction that shall be adapted for use in connection with a trolley conductor which may have any one of a considerable number of locations, both as regards elevation and lateral displacement, with reference to the track upon which the vehicle carrying the trolley is operated.

It is well known that the conditions under which mine locomotives operate vary widely as regards the head room and also the position of the track with reference to the location of the trolley conductor from which the locomotives operating upon the track must receive their power.

In view of the widely varying conditions just mentioned, I have devised the trolley shown in the accompanying drawings, in which—

Figure 1:
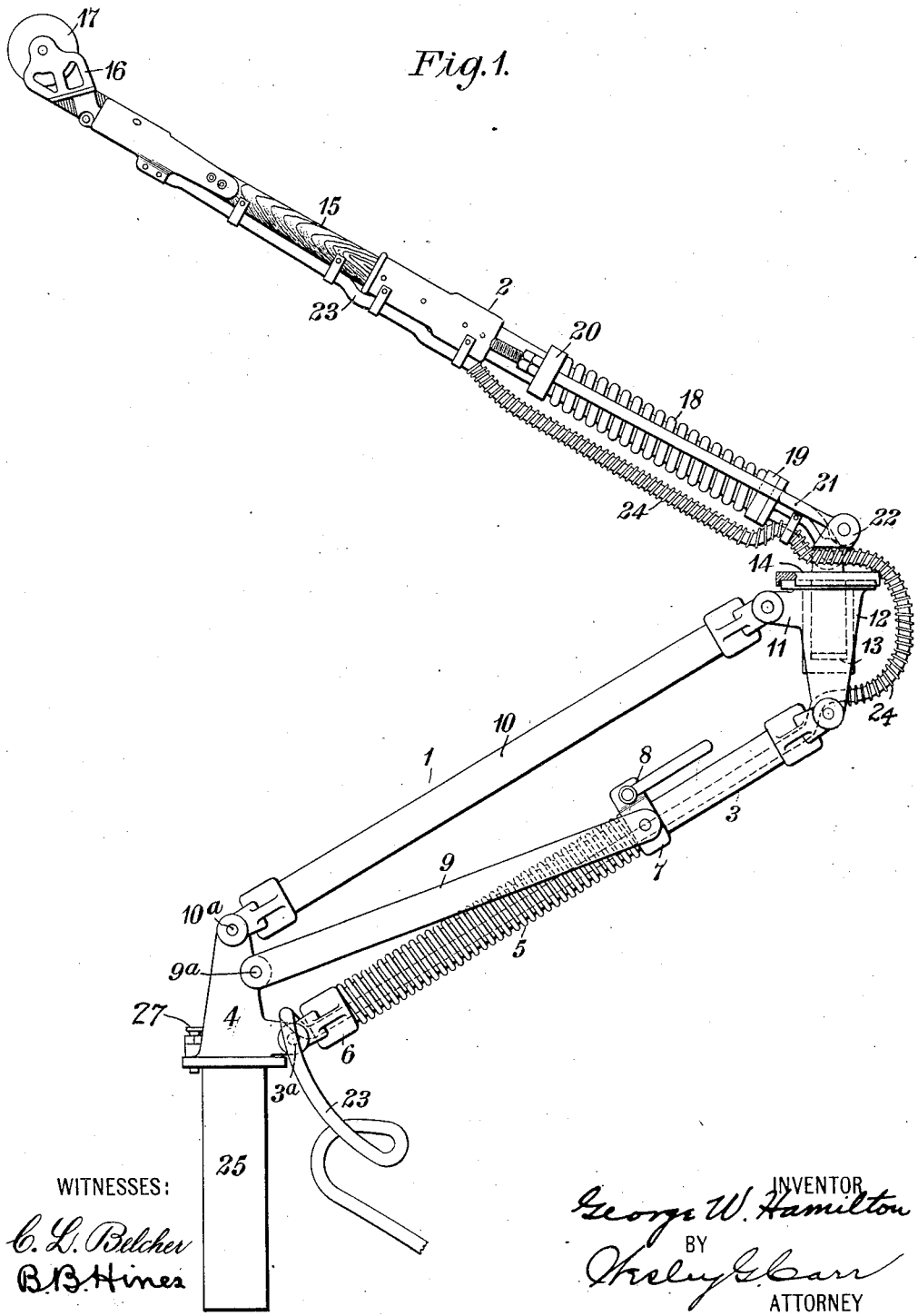
Figure 2:
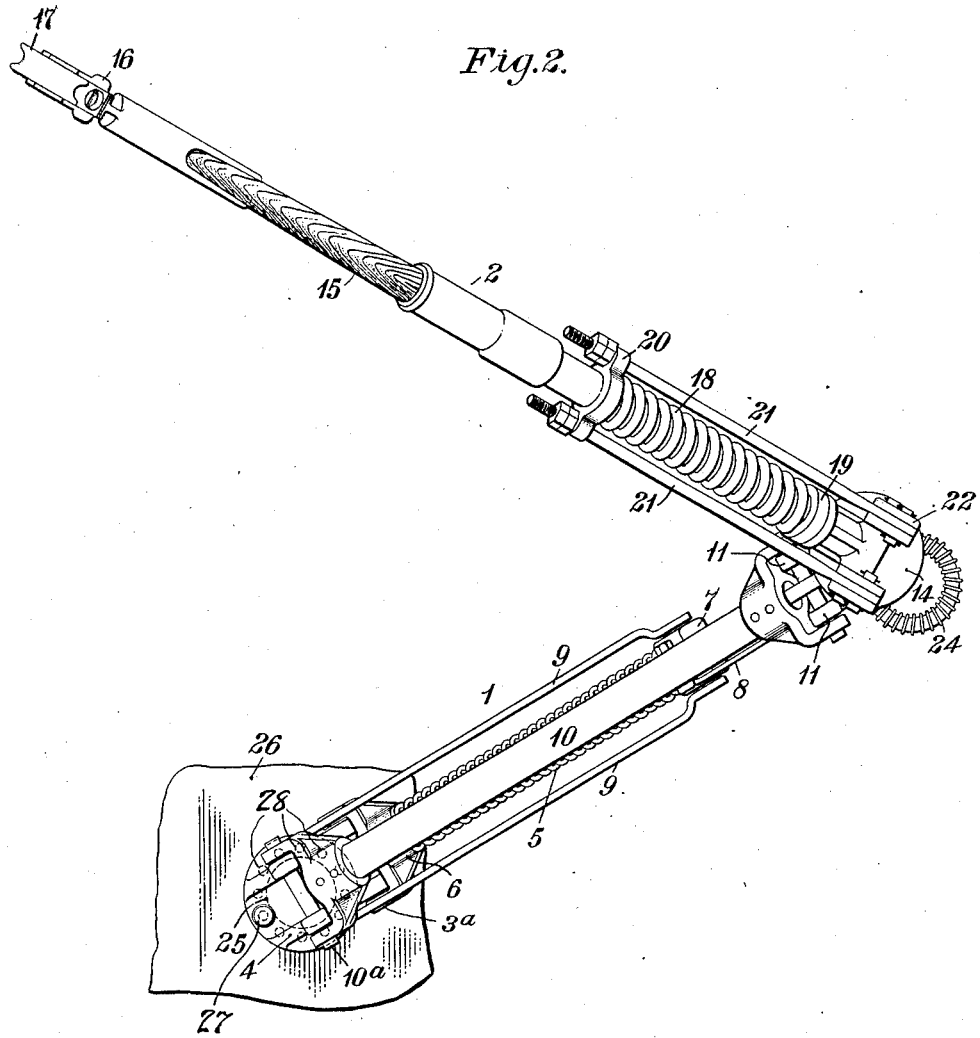
Figure 3:
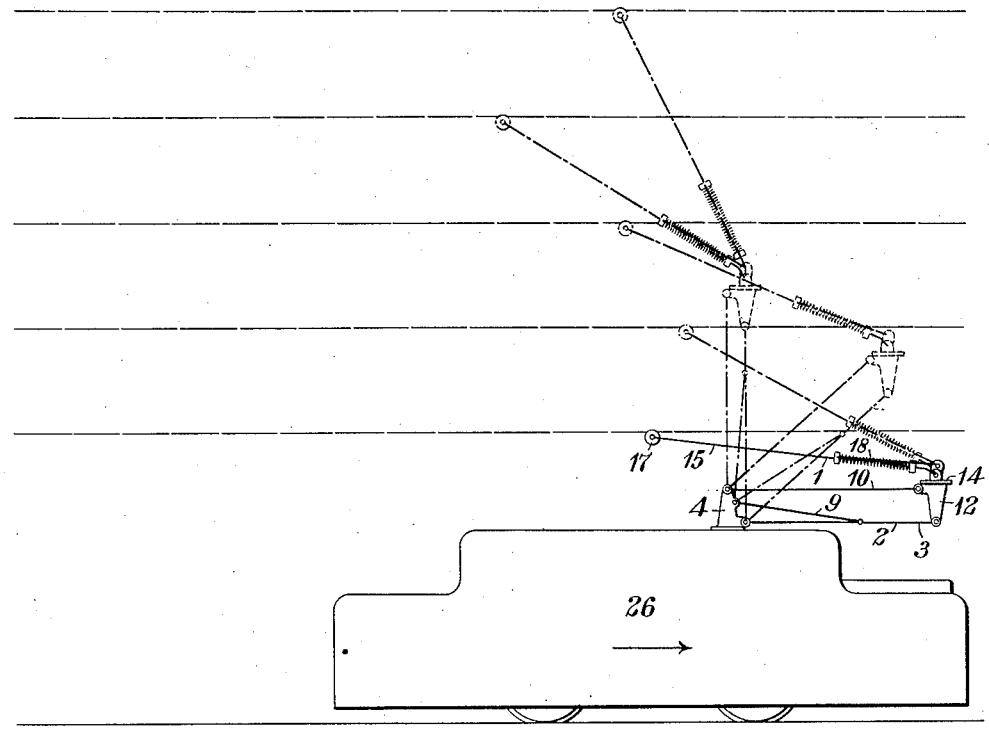
Figure 4:
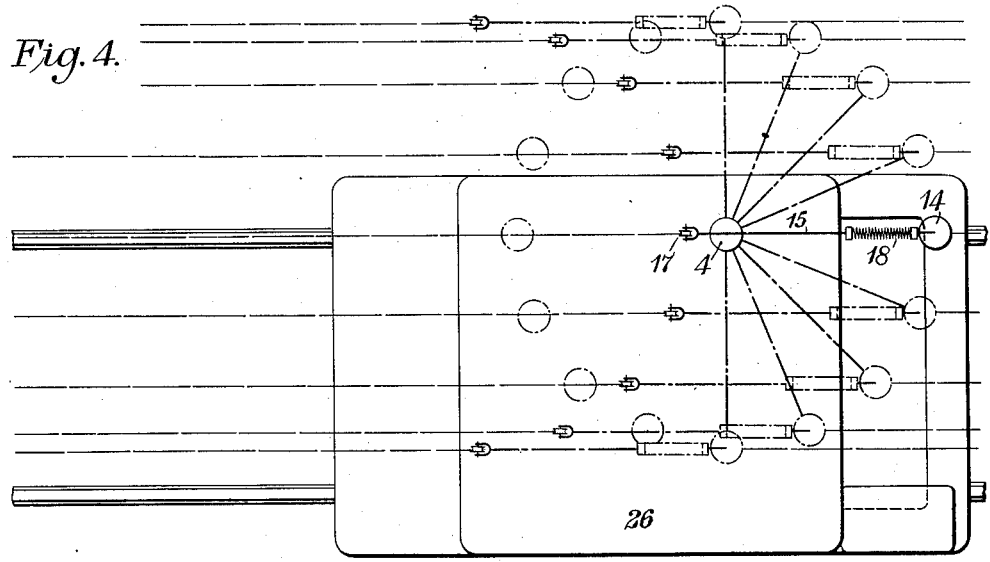

Figure 1 is a side elevation of the trolley with its two members disposed in approximately a single vertical plane. Fig. 2 is a plan view of the trolley shown in Fig. 1, but showing the upper, or wheel-bearing, member disposed at a considerable lateral angle to the base member. Fig. 3 is a view in side elevation, and largely diagrammatic in character, of a locomotive equipped with my invention and showing the trolley in various positions as regards elevation of the trolley conductor above the track. Fig. 4 is a plan view, largely diagrammatic in character, of the apparatus shown in Fig. 3 and indicating the trolley as adapted to make engagement with a trolley conductor having various degrees of lateral displacement with reference to the center of the track upon which the locomotive operates.

As indicated in the drawing, the trolley embodying my invention comprises two principal members 1 and 2, the member 1 comprising a rod 3, the inner end of which is hinge-connected to a base member 4 and is surrounded by a helical spring 5, the inner end of which rests against an enlargement 6 on the member 3 and the outer end of which engages a movable block or head 7 that is provided with a locking device 8 by means of which it may be clamped in any desired position on the rod 3, so that the spring 5, which is normally utilized in connection with certain other parts to be presently described for elevating the member 1 as a whole, may be rendered ineffective, this condition being desired in order that the member 1 may locked either in a horizontal position or at any degree of elevation which may be demanded or desired in view of the elevation of the trolley conductor with which my invention is utilized. The block or head 7 is connected to an intermediate point in the base 4 by means of links 9, the point of connection $9^a$ between the inner ends of the links 9 and the head 4 being sufficiently elevated above the hinge-connection $3^a$ of the rod 3 with the said base to afford the desired leverage action for raising the member 1 when the spring 5 is free to act upon the head or block 7.

The member 1 is a parallel motion structure, the upper member of which is a rod 10 having its inner end hinge-connected at $10^a$ to the upper end of the base 4 and its outer end hinge-connected to suitable lugs 11 on a supplemental base 12, the lower end of the latter being also hinge-connected to the outer end of the rod 3. The supplemental base 12 is provided with a cylindrical socket 13, in which is seated a supplemental base 14 of cylindrical contour, in order to provide a swivel connection between the members 1 and 2, whereby the latter may be free to swing to any degree laterally in either direction.

The upper member 2 comprises a rod 15 which may be partially of insulating material, as indicated, and be provided, at its upper or outer end, with a harp 16, in which is journaled a trolley wheel 17. Mounted upon the lower portion of the rod 15, is a helical spring 18, the lower end of which rests against a shoulder 19 and the upper end of which engages a block or head 20 that is connected, by means of rods 21, to arms 22 that project upwardly from, and at an angle to, the member 14, the arrangement of parts being such that the spring 18 tends to elevate the wheel 17 and hold it yieldingly in contact with the under side of the trolley conductor. The desired electrical connection between the propelling motors and the trolley wheel 17 may be effected by means of a flexible conductor or cable 23, the exposed portions of which are provided with a helical wire armor, as indicated at 24 and as is usual in devices of this character.

The cylindrical extension 25 of the base 4 fits in a suitable socket (not shown) in the top of the locomotive 26, so as to provide a swiveling structure and thus permit of swinging the entire trolley or the member 1 laterally, to any extent, in either direction. As has already been indicated, the member 1 may be sustained in any angular position, with reference to a horizontal plane, that may be desired, by reason of the elevation of the trolley conductor, by its own weight and the locking device 8, which prevents the spring 5 from exercising its elevating function, and, as is clearly indicated in Figs. 3 and 4, both members 1 and 2 may be swung laterally to any position desired, and be locked in that position by means of a pin 27 that is carried by the base 4 and may be inserted in any one of an annular set of holes 28 with which the seat for the base 4 is provided.

Structural details may, of course, be varied from what is shown and described, provided the modified structure falls within the scope of the appended claims.

I claim as my invention:

1. In a vehicle trolley, the combination with a swiveled base, and a member hinged to said base, of a supplemental base swiveled to the free end of said member, an extension member hinged to said supplemental base, and a trolley wheel at the free end of said extension member.

2. An extension trolley comprising two pole members joined together end to end by a hinge and a swivel connection and respectively provided with a trolley wheel and with a hinge and swivel base connection at their remote ends.

3. The combination with a swiveled base and a trolley member hinged to said base and provided with an elevating spring, of a supplemental base swiveled to the outer end of said member and a wheel-bearing member hinged to said supplemental base and provided with an elevating spring.

4. The combination with a swiveled base and a spring-elevated parallel-motion frame hinged to said base, of a supplemental base swiveled to the outer end of said frame, a wheel-bearing member hinged to said supplemental base and having an elevating spring.

5. The combination with a swiveled base and a spring-elevated parallel-motion frame hinged to said base and provided with means for locking the elevating spring in an inactive position, of a supplemental base swiveled to said frame, and a wheel-bearing member hinged to said supplemental base and provided with an elevating spring.

6. In a vehicle trolley, the combination with a swiveled base, a member hinged to said base and means for locking said base in any position to which it may be adjusted, of a supplemental base swiveled to the free end of said member, an extension member hinged to said supplemental base, and a trolley wheel at the free end of said extension member.

7. An extension trolley comprising two members joined together end to end by a hinge and a swivel connection and respectively provided with a trolley wheel and with a hinge and swivel base connection, and means for locking said swivel base connection in any position to which it may be adjusted.

In testimony whereof, I have hereunto subscribed my name this 22nd day of June, 1911.

GEORGE W. HAMILTON.

Witnesses:
J. M. HIPPLE,
B. B. HINES.

---

Copies of this patent may be obtained for five cents each, by addressing the "Commissioner of Patents, Washington, D. C."